N. W. CLARK.
Refrigerating Building.
No. 49,604. Patented Aug. 29, 1865.
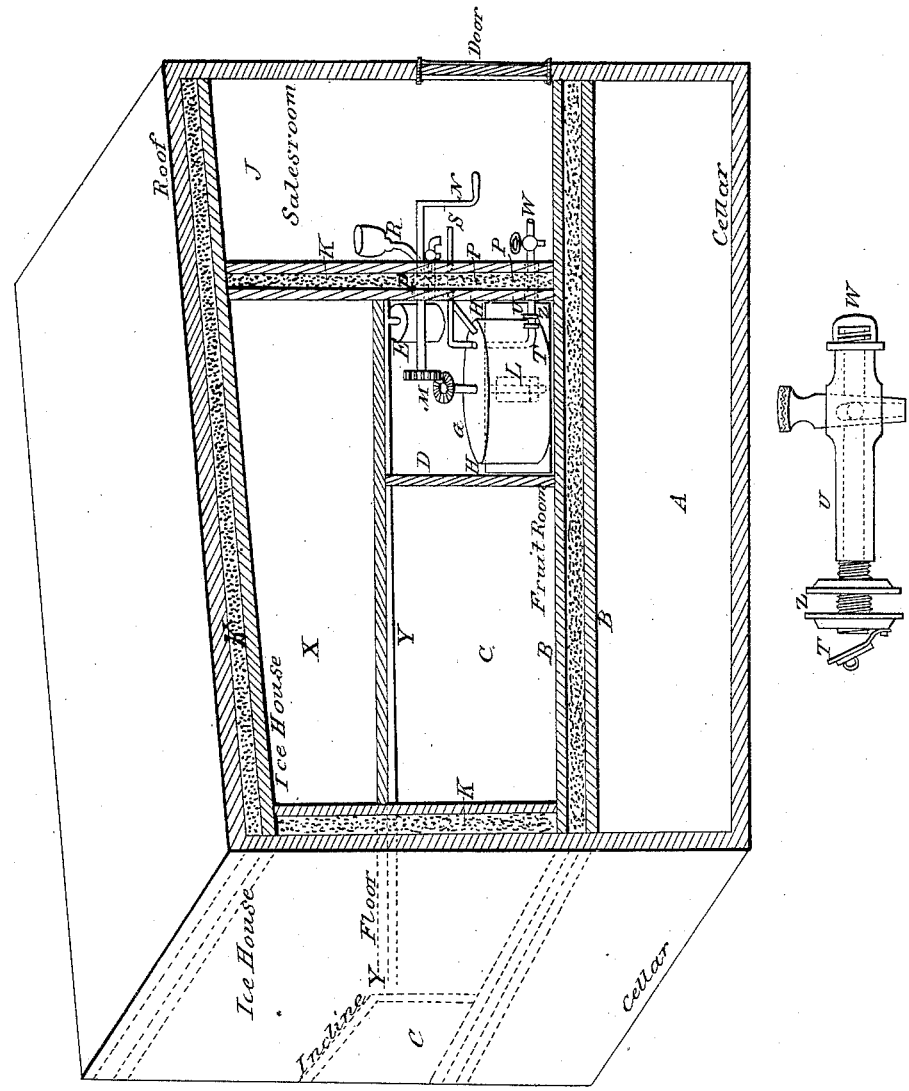
Witnesses:
Daniel Reigart
C. S. Reigart
Inventor:
Nelson W. Clark
By his Attorney
J. Franklin Reigart

UNITED STATES PATENT OFFICE.

NELSON W. CLARKE, OF DETROIT, MICHIGAN.

IMPROVEMENT IN BUILDINGS FOR PRESERVING MILK, FRUIT, &c.

Specification forming part of Letters Patent No. 49,604, dated August 29, 1865.

*To all whom it may concern:*

Be it known that I, NELSON W. CLARKE, of Detroit city, Wayne county, State of Michigan, have invented an Improved Creamery and Ice-House for Preserving Fruits, Vegetables, Meats, &c.; and I do hereby declare the following to be an exact description thereof, reference being had to the accompanying drawings, and to the letters of reference marked thereon, making a part of this specification.

The nature of my invention consists in the erection of a building of any required size and dimensions, in which are different apartments surrounded with packed ice.

In one of the apartments is a reservoir for catching the water from the melting ice, and also a large milk-reservoir for holding the milk or other fluids, with apparatus for filling, stirring, and discharging the milk or fluids as required; also, the shape and construction of the faucet attached to the milk-reservoir, that has a shut-off or valve operated by a jointed lever and a screw-head in front, so that the faucet can at any time be cleaned and kept free from soured or clogged milk without emptying the milk-reservoir.

A represents a cellar or place for packing ice; B, the flooring of the building, that is made double and packed between with sawdust, so as to be air-tight. Above the first floor, B, I have rooms or apartments C C, in which I store fruits, vegetables, or meats. Adjoining the apartments C C is another room, D, which contains a water-filter, E, and a milk-reservoir, G, that is close, and contains the milk, cream, or any liquids necessary to be kept cool and preserved. The filter E and reservoir G rest in the water-tank H to be cooled. An adjoining apartment, J, is intended to be used as a salesroom, and the apparatus is operated in this room J so that the apartment D may always be kept air-tight and cold, the partitions K K being also double and filled in between with sawdust. In the center of the milk-reservoir G, I have an upright shaft, with dasher L, having a bevel-gearing, M, at top, operated by a crank, N, (extending through a tube, P, in the partition,) that is intended to be worked in the salesroom J, so as to stir up the milk, when required, without going into the room D.

A funnel attached to the pipe R (that leads into the reservoir G) is for the purpose of filling the reservoir also from the salesroom J, and that the warm evaporation from the milk may pass off into the salesroom and prevent it from circulating in the apartment D.

A handle, S, extending from the salesroom J, is attached to a jointed lever that extends into the milk-reservoir G, having a valve or shut-off, T, that is attached to the nut Z of the faucet U, that closes the pipe of the faucet U, so that the faucet may be cleaned at any time. The faucet also extends into the salesroom J, to be used to draw off milk in any quantity when required.

The front or head of the faucet is screwed on or off at any time for the purpose of cleaning the faucet of any impurities that might collect in it to the injury of the milk when drawn off.

The nut Z is fastened securely to the reservoir, and the faucet U can at any time be unscrewed and taken off to be cleaned or renewed; and when the milk becomes cold and of the same temperature as that of the room D, I draw out the funnel and pipe R and close the aperture tightly with a plug or cork, and the milk will then retain its purity and can be preserved for weeks.

X is another upper apartment and air-tight chamber, which is packed with ice. The floor is incline-shaped to the center and open in the center a few inches the whole length of the apartment.

A trough, Y, extends along the whole length of the center underneath the aperture, for the purpose of conducting the drippings and water from the melting ice into the filter E and to the tank below; and by my arrangement of apartments and apparatus I not only preserve the milk, vegetables, &c., but the ice is preserved by conveying the water from the ice, as water running through ice causes the ice to melt much faster than to convey the water from it, and I use the cold water from the ice for preserving the milk, &c., making the whole building and arrangement one of economy and saving, and thus converting all the cold from the ice into practical use.

What I claim as my invention, and desire to secure by Letters Patent, is—

1. The arrangement and construction of the building, with its apparatus E, G, H, R, U, and W, as herein described, and for the purposes set forth.

2. The arrangement of the devices R, N, S, W, and U so as to be operated in the one apartment, J, without affecting the temperature of the adjoining apartment, D.

3. The mode of preserving the ice and saving all the drippings, by conveying the cold water from the melting ice by means of pipes through a series of rooms to one or more reservoirs or tanks.

4. The shape and construction of the faucet U, arranged and combined with the head W and valve T, as herein described, and for the purposes set forth.

5. Keeping the sawdust undisturbed by means of tubes P P P in the partition-walls, so that the crank N, handle S, and faucet U may be opened or removed without opening the apartment D.

N. W. CLARKE.

Witnesses:
J. FRANKLIN REIGART,
EDM. F. BROWN.